US008924039B2

United States Patent
Miller, IV et al.

(10) Patent No.: US 8,924,039 B2
(45) Date of Patent: Dec. 30, 2014

(54) VEHICLE OPERATOR PRESENCE DETECTOR

(71) Applicants: Thomas Kenan Miller, IV, Greenville, NC (US); Stephen Allen Moore, Jr., Greenville, NC (US)

(72) Inventors: Thomas Kenan Miller, IV, Greenville, NC (US); Stephen Allen Moore, Jr., Greenville, NC (US)

(73) Assignee: NACCO Materials Handling Group, Inc., Fairview, OR (US)

( * ) Notice: Subject to any disclaimer, the term of this patent is extended or adjusted under 35 U.S.C. 154(b) by 0 days.

(21) Appl. No.: 13/923,703

(22) Filed: Jun. 21, 2013

(65) Prior Publication Data

US 2014/0005858 A1    Jan. 2, 2014

Related U.S. Application Data (60) Provisional application No. 61/666,448, filed on Jun. 29, 2012.

(51) Int. Cl.

| | |
|---|---|
| *G05D 1/00* | (2006.01) |
| *B60K 23/00* | (2006.01) |
| *B60K 28/04* | (2006.01) |
| *B66F 9/075* | (2006.01) |

(52) U.S. Cl.
CPC ............. *B66F 9/075* (2013.01); *B60K 28/04* (2013.01)
USPC ................................................ 701/1; 180/78

(58) Field of Classification Search
USPC ................................................ 701/1; 180/78
See application file for complete search history.

(56) References Cited

U.S. PATENT DOCUMENTS

| | | | |
|---|---|---|---|
| 5,240,455 A * | 8/1993 | Sharp ............................... 454/61 |
| 7,295,910 B2 * | 11/2007 | Sakai et al. ..................... 701/45 |
| 7,300,092 B2 * | 11/2007 | Dunn ............................... 296/70 |
| 7,347,299 B2 * | 3/2008 | Billger et al. .................. 180/326 |
| 2004/0011573 A1 * | 1/2004 | Kamen et al. .................. 180/7.1 |
| 2006/0061122 A1 * | 3/2006 | Billger et al. ............. 296/65.07 |

FOREIGN PATENT DOCUMENTS

| | | |
|---|---|---|
| EP | 2096078 A1 | 9/2009 |
| EP | 2116434 A1 | 11/2009 |
| WO | 9809910 A1 | 3/1998 |

OTHER PUBLICATIONS

Search Report and Written Opinion for related EP Patent App. No. 13173954.2-1752, dated Oct. 15, 2013.

* cited by examiner

*Primary Examiner* — Thomas G Black
*Assistant Examiner* — Tyler Paige (57) ABSTRACT

By law, a stand-up lift truck operator must be trained to keep both feet and legs located within an operator compartment. An exemplary operator presence detector includes multiple zones, or areas, configured to receive an operator's feet. A sensor arrangement detects the presence of the operator's feet and a logic device determines whether the operator's feet are present in the zones or areas in a predetermined configuration, such as a configuration that reinforces operator training to keep both feet in a designated area on a compartment platform. In preferred arrangements, based on whether the operator's feet are present in the zones in a predetermined configuration, at least one vehicle function is enabled or disabled which may serve to reinforce an operator's training to keep both feet and legs located within an operator's compartment.

18 Claims, 9 Drawing Sheets

| ENABLE / DISABLE | 55 | 60 | 65 | 70 |
|---|---|---|---|---|
| DISABLE | X | X | O | O |
| ENABLE | X | O | X | O |
| DISABLE | X | O | O | X |
| DISABLE | O | X | X | O |
| ENABLE | O | X | O | X |
| DISABLE | O | O | X | X |
| ENABLE | X | X | X | O |
| ENABLE | X | X | O | X |
| ENABLE | X | O | X | X |
| ENABLE | O | X | X | X |
| ENABLE | X | X | X | X |

X = FOOT PRESENCE DETECTED IN ZONE
O = NO FOOT PRESENCE DETECTED IN ZONE

VEHICLE OPERATOR PRESENCE DETECTOR

RELATED APPLICATIONS

This application claims priority to U.S. Provisional Patent Application No. 61/666,448 titled "Vehicle Operator Presence Detector," filed on 29 Jun. 2012.

TECHNICAL FIELD

The disclosure pertains to detecting a vehicle operator's presence and enabling or not enabling one or more vehicle functions based on such detection, for example, to reinforce operator training.

BACKGROUND

Operators stand when driving industrial vehicles, such as end-rider lift trucks, reach trucks, straddle trucks, docker trucks, order picker trucks and motorized pallet trucks. By federal law, the operators of such industrial vehicles are required to have rigorous training, certification and recertification by their employers. Such training includes instruction that the operator maintain both feet and legs within the operator's compartment during use. Various systems and methods have been developed to reinforce such operator training while an industrial vehicle is in use.

SUMMARY

Disclosed systems and methods detect when an operator is or is not standing properly in an operator's compartment, preferably in a manner consistent with the driver's training. In preferred embodiments, the entire vehicle, or one or more functions of the vehicle, may be enabled or disabled depending on whether an operator's position on a driving platform is consistent with the training received by the operator. For example, a drive function of an end-rider lift truck may be disabled when a detection device or system associated with such a vehicle detects there is no operator on the drive platform or a driver on the drive platform is not standing with both feet in a predetermined configuration; or multiple functions may be disabled, such as a drive function and a hoist function.

According to one embodiment, an operator presence detector includes multiple zones, or areas, configured to receive an operator's feet. A sensor arrangement detects the presence of the operator's feet and a logic device determines whether the operator's feet are present in the zones or areas in a predetermined configuration, such as a configuration that reinforces operator training to keep both feet in an operator's compartment. Based on whether the operator's feet are detected in the zones in a predetermined configuration, at least one vehicle function is enabled or disabled which may serve to reinforce an operator's training.

DETAILED DESCRIPTION

Figure 1:
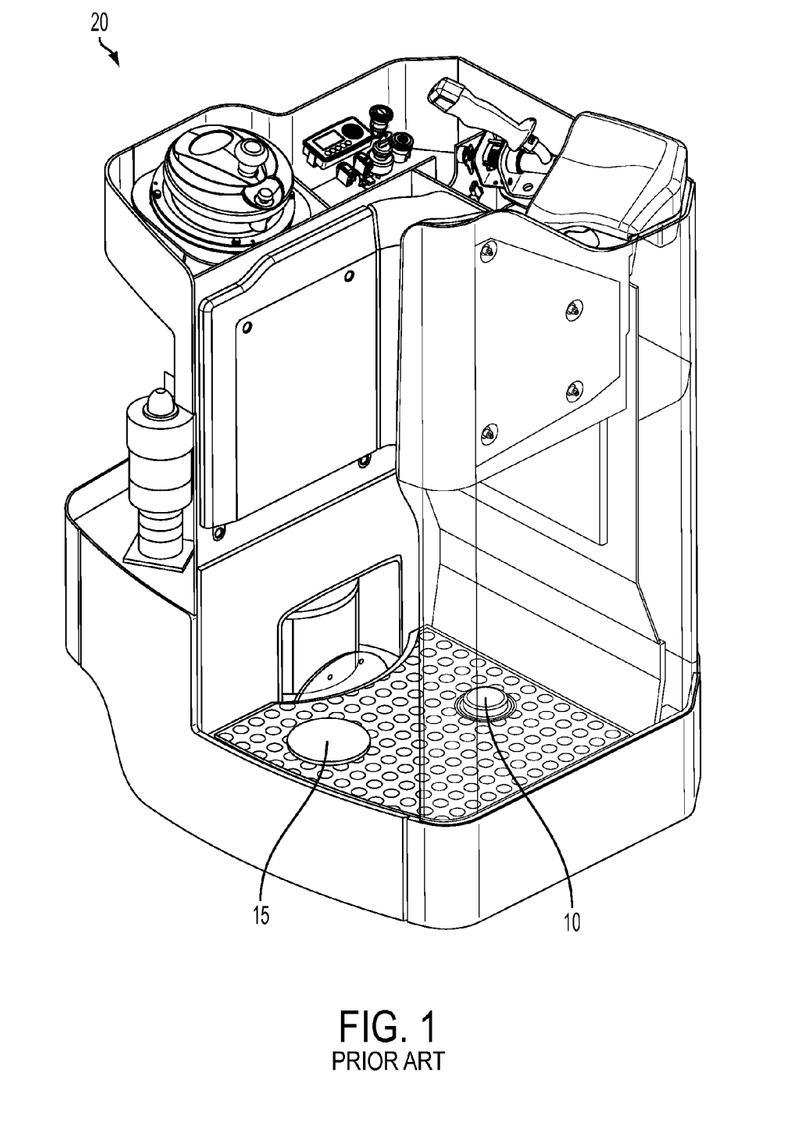
FIGS. 1 and 1A are diagrams of prior art operator presence detectors.
Figure 1A:
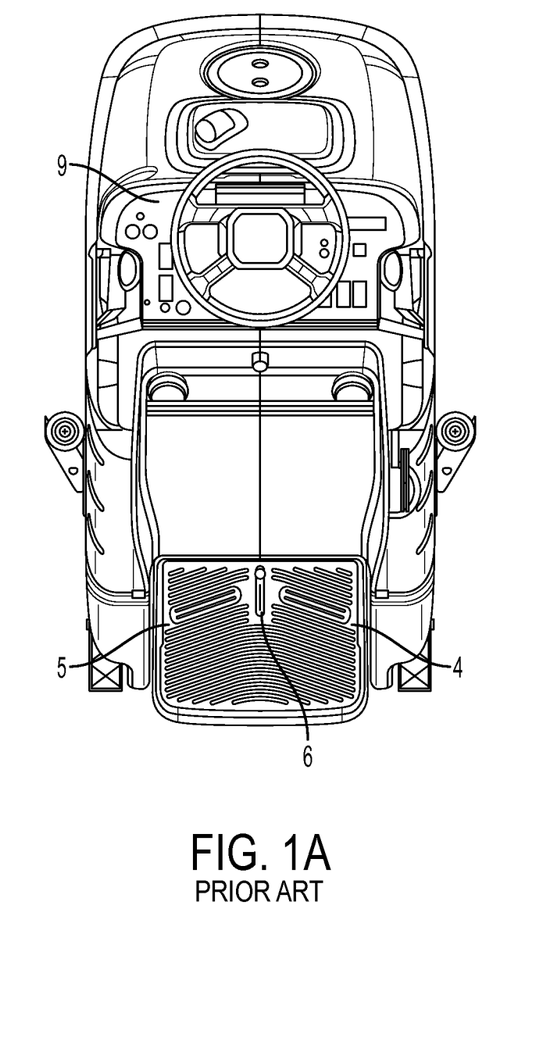

The present inventors have recognized disadvantages associated with commonly available operator presence detectors associated with driving platforms for vehicles. One such disadvantage is that some operator presence detectors may be activated by a single foot, thus not reinforcing operator training by enabling an operator to operate a vehicle and all of its functions with only one foot on a driving platform. For an example, see U.S. Pat. No. 8,141,886 at column 12, line 13 through column 13, line 21 and FIGS. 8 and 9 therein. Another such disadvantage is that some operator presence detectors include two specific places, typically having a switch located at each place, where an operator must place each foot, thus providing only a limited ability for an operator to shift foot placement which may lead to fatigue or discomfort for the operator while driving the vehicle. An example of such a prior art detector is illustrated in FIG. 1 which requires an operator to have one foot on switch 10 and the other foot on switch 15 to drive truck 20. Another example illustrated in FIG. 1A is the iScrub Chariot 9 manufactured by Windsor of Englewood, Colorado. The iScrub Chariot 9 includes a throttle 4 and an operator presence pedal 5 separated by a protruding fin 6. Described embodiments may overcome such disadvantages, or may address other needs.

Figure 2:
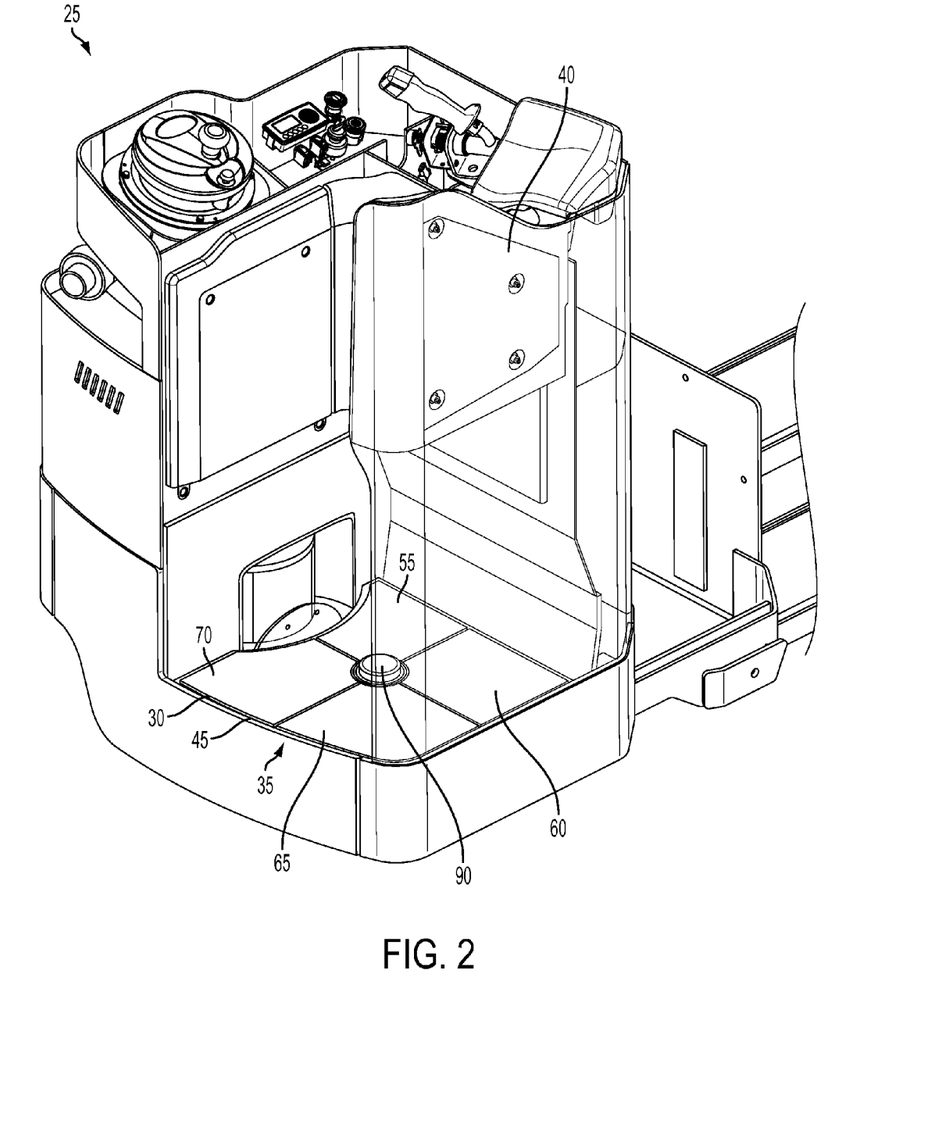
FIG. 2 is a diagram of an embodiment of an operator presence detector in an end-rider lift truck.

FIG. 2 illustrates a vehicle, such as end-rider lift truck 25, having a driving platform 30 associated with an example operator presence detector 35. When driving the end-rider lift truck 25, an operator's back may rest against backrest 40 and both feet are placed on the driving platform 30, preferably without either foot extending beyond an outer edge 45 of the driving platform 30.

Figure 3:
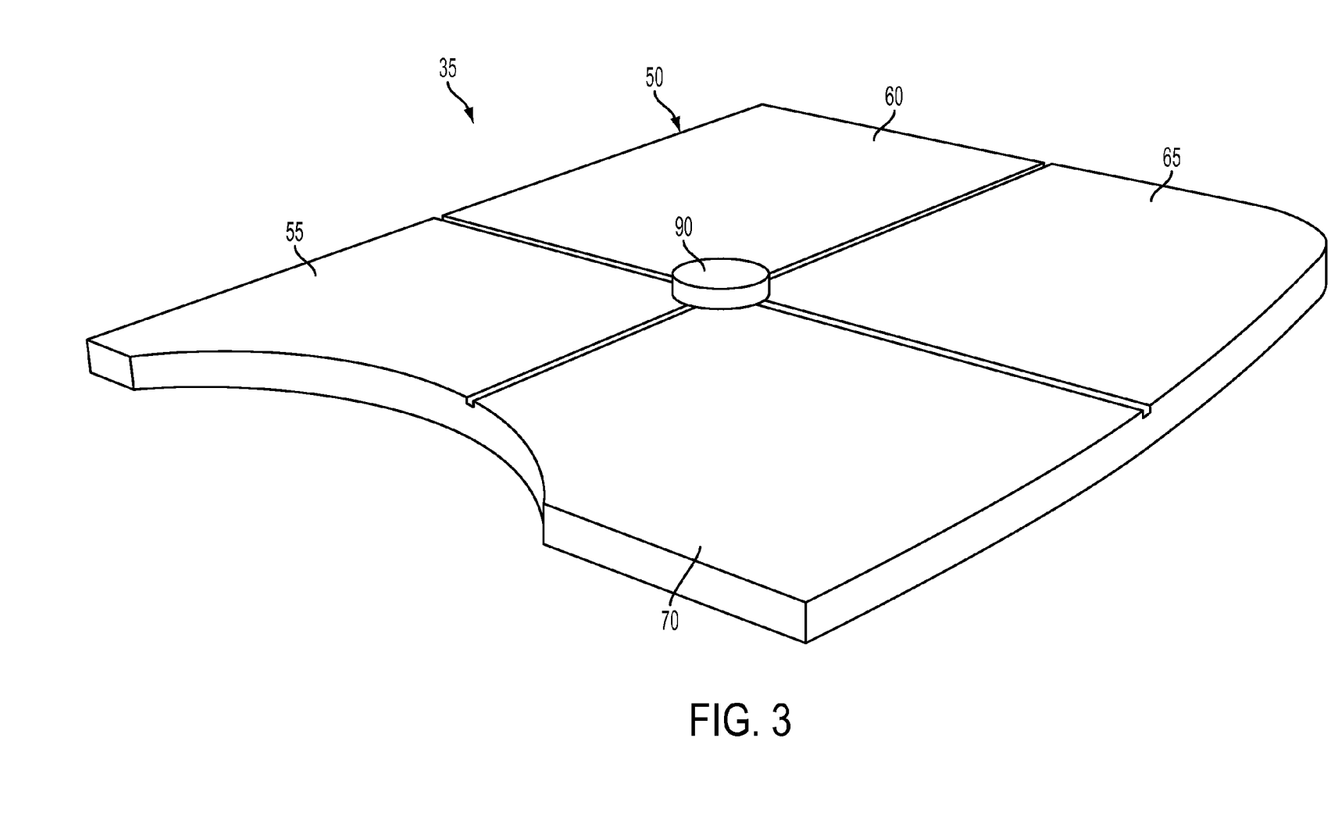
FIG. 3 is an enlarged view of the operator presence detector of FIG. 2.

The example operator presence detector 35 includes a sensor arrangement comprising a pressure sensitive mat 50 (FIG. 3) configured with four zones 55, 60, 65 and 70 as best illustrated in FIG. 3. Each zone 55, 60, 65 and 70 is configured to receive at least a portion of an operator's foot. In the embodiment illustrated in FIGS. 2 and 3, each zone 55, 60, 65 and 70 is large enough for an operator to place the entirety of a foot in any of the zones 55, 60, 65 and 70 while leaving surface area of a zone 55, 60, 65 or 70 uncovered by such a received foot. In other embodiments, a zone may be configured to receive an operator's foot by being sized and constructed such that only a portion of an operator's foot fits into or on the zone or such that an operator's foot completely covers the zone. A zone receiving an operator's foot therefore includes an operator placing at least a portion of a foot into or on a zone as well as an operator placing an entire foot into or on a zone.

The operator presence detector 35 is configured to detect an operator's foot in any of zones 55, 60, 65 and 70. For example, when an operator's foot is received in one of the zones 55, 60, 65 or 70 and such foot applies a minimum load in the range of approximately 10 kilograms (Kg) disk of diameter 80 millimeters (mm) to approximately 20 kilograms (Kg) disk of diameter 80 millimeters (mm), and preferably in the range of approximately 12 kilograms (Kg) disk of diameter 80 millimeters (mm) to approximately 18 kilograms (Kg) disk of diameter 80 millimeters (mm), the portion of the pressure sensitive mat 50 comprising the zone, or zones, where the foot is placed generates a foot-present signal, such as an analog or digital electrical signal, an optical signal or other suitable signal, that is transmitted to a logic device, for example, via a cable, such as cable 75A (FIG. 4), or wirelessly. Thus, when an operator's foot is placed in zone 55 and sufficient force is applied to the underlying pressure sensitive mat 50, a foot-present signal corresponding to zone 55 is transmitted to a logic device and likewise for each of zones 60, 65 and 70.

Figure 4:
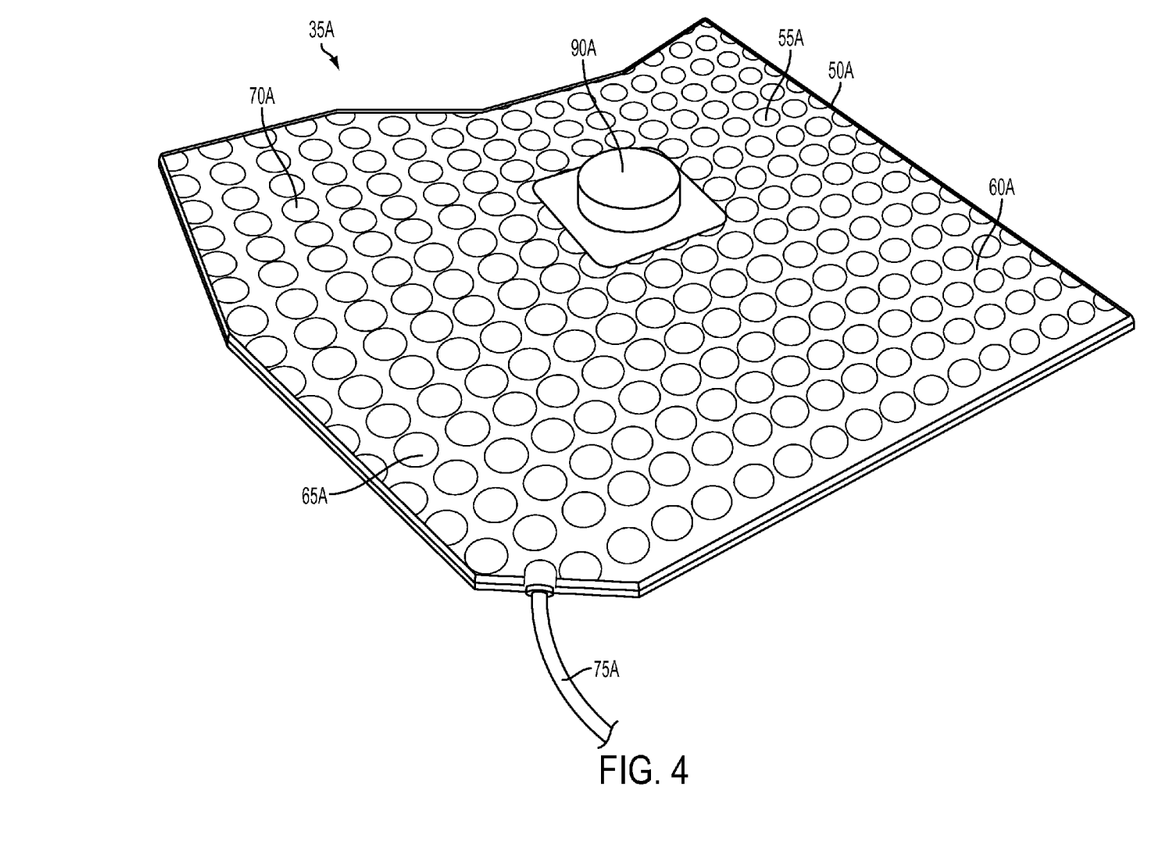
FIG. 4 is an enlarged view of an alternate operator presence detector.
Figure 5:
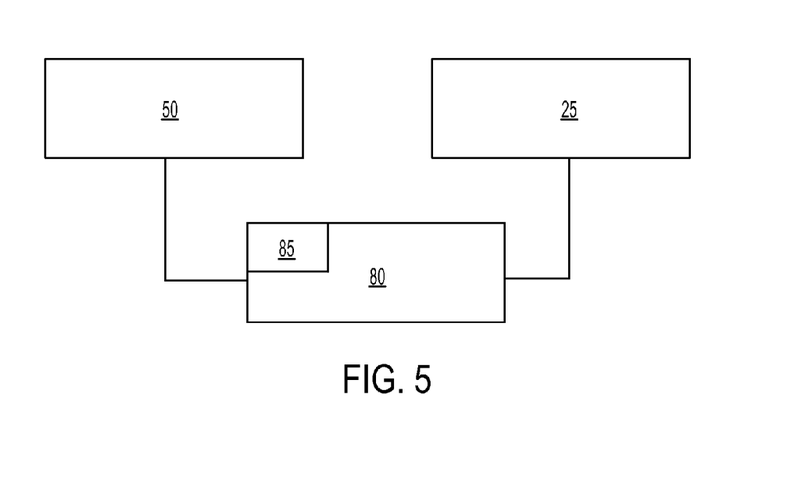
FIG. 5 is a schematic diagram of an operator presence detector installation.

Cable 75A is connected to a logic device, such as digital processor 80 (FIG. 5) that receives the foot-present signals generated by the operator presence detector 35A. The digital processor 80 is programmed to determine in which of zones 55A, 60A, 65A and 70A the operator's feet are present based on the foot-present signals. Such programming may be accomplished via software operating with the digital processor 80, hardware that is formed as part of the digital processor 80 or other suitable manner.

Figure 6:
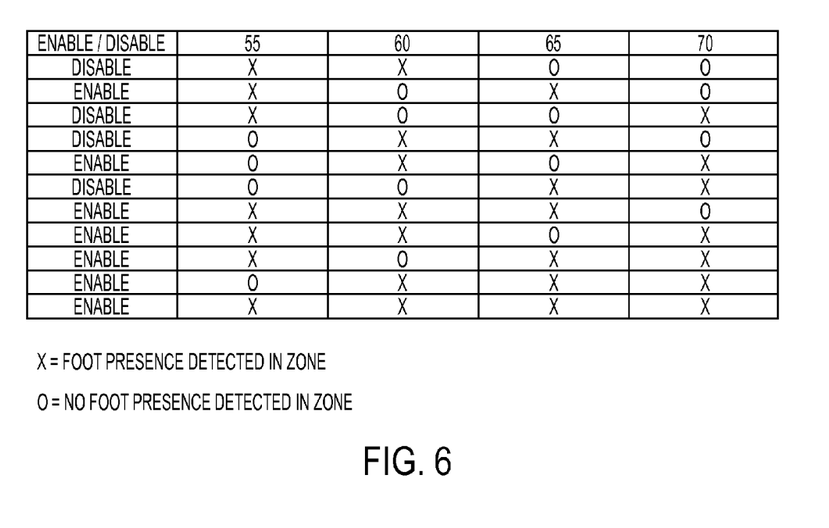
FIG. 6 is a diagram of an exemplary dataset used by a logic device.

The digital processor 80 is further programmed to determine whether the operator's feet are in the zones 55, 60, 65 and 70 in a predetermined configuration. In one embodiment, the digital processor's programming compares the zones where a foot is determined to be present against a dataset of predetermined configurations with an enable designation. An example dataset of such predetermined configurations is illustrated in FIG. 6. The dataset illustrated in FIG. 6 applies to an operator presence detector with 4 zones, such as operator presence detector 35, and includes 11 unique combinations, 7 of which carry an enable designation and 4 of which carry a disable designation. If a foot-present signal comes from only one, or none, of the zones 55, 60, 65, or 70 a disabled designation applies. For the four zone operator presence detector 35, the example dataset illustrated in FIG. 6 provides an almost unlimited variety of operator foot placement positions that will enable one or more vehicle functions. As discussed below, providing numerous foot placement positions for an operator preferably permits an operator to shift foot placements without interrupting one or more vehicle functions. Based on the number of zones, the variety of operator foot placements desired, the desired locations for an operator's feet, for example, to reinforce operator training, or other suitable factors, singularly or in any combination, a dataset may be constructed to designate the combination of zones that must detect a foot to enable one or more vehicle functions, or to disable one or more vehicle functions, singularly or in any combination.

The digital processor 80 is further programmed to transmit, or send, an enable, or a disable, signal to the vehicle 25, for example, to a system that performs a vehicle function, such as a drive, or traction, system (not illustrated) in response to determining that an operator's feet are present in the zones 55, 60, 65 and 70 in a predetermined configuration. Such transmission by the digital processor 80 may be directly to a vehicle system, or may be indirect, that is, via another processor or vehicle system.

Preferably, one or more vehicle functions, such as activating a drive system, hoist system or other suitable system are disabled unless an enable signal is transmitted by digital processor 80. In certain embodiments, the digital processor 80 transmits or sends a disable signal, for example, when no operator is detected by the operator presence detector or the operator's feet are not present in the zones of an operator presence detector in a predetermined configuration, thus not enabling or disabling one or more vehicle functions.

Optionally, a signal delay device may be included. A signal delay device preferably continues to provide a foot-present signal to the logic device for a predetermined amount of time or provides a timing count that must elapse before the logic device stops sending an enable signal in response to an operator removing a foot from a zone or zones. For example, an operator driving end-rider lift truck 25 initially starts driving with one foot in zone 55 and the other foot in zone 65. While driving, the operator may shift foot placement, for example, to ease discomfort or because the operator is becoming fatigued, and thus moves the foot present in zone 55 to span zones 55 and 60 and the foot present in zone 65 to zone 70.

Instead of disabling the drive function (or other suitable function or functions) of the end-rider lift truck 25 in response to the interruption in foot-present signals from the operator presence detector 35 because of the operator's foot shifting, a signal delay device, such as clock 85, is used to measure, or time, a predetermined amount of time, such as 0.10 to 0.30 second and preferably 0.15 to 0.25 second that must elapse before the processor 80 stops transmitting an enable signal to the end-rider lift truck 25. During the predetermined amount of time, new foot-present signals corresponding to zones 55, 60 and 70 are sent to the processor 80. Based on the foot-present signals corresponding to zones 55, 60 and 70, the processor 80 determines that the operator's feet are present in zones in a predetermined configuration (using the dataset illustrated in FIG. 6) and sends an enable signal to the end-rider lift truck 25. Thus, an operator may shift foot locations from one predetermined zone configuration to another predetermined zone configuration without disabling a vehicle function because of such shifting.

Although optional, the embodiment illustrated in FIGS. 2 and 3 includes a physical barrier, such as disc 90. Disc 90 is arranged, that is, appropriately sized and located, to hinder an operator from placing one foot in a position where the sensor arrangement, such as pressure sensitive mat 50, detects the presence of the one foot in more than one of zones 55, 60, 65 and 70 such that a vehicle function would be enabled by the one foot. For example, the top of disc 90 may be approximately 25 mm above the surface of the operator presence detector 35, be approximately 75 mm in diameter and be located at the intersection of zones 55, 60, 65 and 70. For the example dataset of preconfigured zones illustrated in FIG. 6, the disc 90 hinders an operator from applying sufficient force with one foot to cause the pressure sensitive mat 50 to detect the presence of the one foot in both of zones 55 and 65 or in both of zones 60 and 70 and thus enable one or more vehicle functions with only one foot.

Figure 4A:
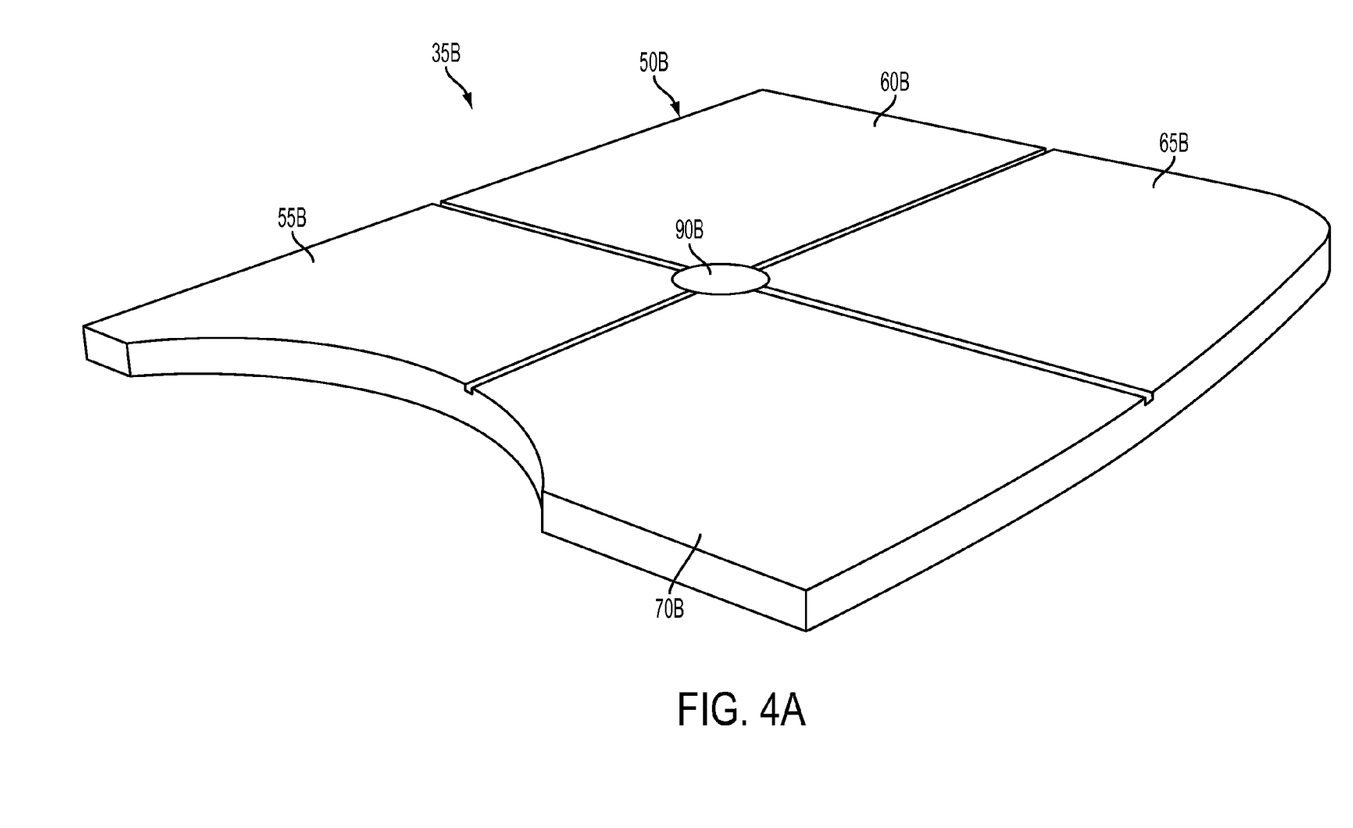
FIG. 4A is an enlarged view of an alternate operator presence detector.

Optionally, a shut-off zone, such as zone 90B (FIG. 4A), may be included between the other zones 55B, 60B, 65B, and 70B to hinder an operator from enabling one or more vehicle functions by activating two or more of zones 55B, 60B, 65B, and 70B in a predetermined manner with one foot. For example, zone 90B may be used instead of a physical barrier. A logic device may be programmed to disable a vehicle function, such as traction, or to apply a vehicle function, such as braking, when a foot-present signal is received from zone 90B, even if foot present-signals are received from a combination of zones 55B, 60B, 65B, and 70B in a predetermined zone configuration.

Figure 7:
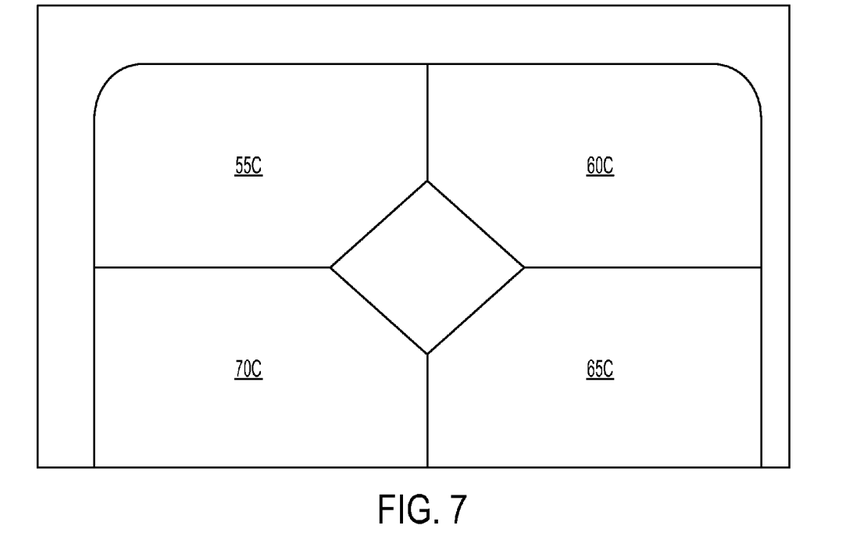
FIG. 7 is a schematic diagram of another operator presence detector embodiment.

Optionally, other embodiments may locate the zones with respect to each other in a physical arrangement that hinders an operator from placing one foot in a position where the sensor arrangement detects the presence of the one foot in more than one zone such that a vehicle function would be enabled by the one foot. For example, zone 55C (FIG. 7) may be spaced approximately 50 mm from zone 65C and zone 60C may be spaced approximately 50 mm from zone 70C. Other embodiments may combine one or more of a physical barrier, shut-off zones, and locating the zones with respect to each other such that the location of the zones, the location of the shut-off zones and/or the physical barrier cooperate to hinder an operator from placing one foot in a position where the sensor arrangement detects the presence of the one foot in more than one zone such that a vehicle function would be enabled by the one foot.

While a preferred zone layout, sensor arrangement, logic device and physical barrier have been described, the invention is not so limited. Four zones were described, however the number of zones may be 2 or more, preferably between 3 and 6. The number, location, size and shape of the zones will vary according to numerous factors including the vehicle layout and where it is desirable for an operator's feet to be placed.

Suitable sensor arrangements include pressure sensitive or weight activated switches with one or more such switches underlying each zone, optical sensors (such as light beam interruption detectors or imagers coupled with object recognition software), thermal sensors and other devices suitable for identifying the location of an operator's feet with respect to the zones of an operator presence detector.

Suitable logic devices include analog devices such as relays, application-specific integrated circuits, microprocessors and other devices suitable for receiving foot-presence signals and determining in which zones an operator's feet are present based on such foot-present signals. Note that a dataset is not required for use with all logic devices. For example, an analog logic device may make its determinations regarding in which zones a foot is present based on a combination of input signals, such as specific lines or channels carrying a signal. A logic device may thus be programmed via the physical construction of the logic device, computer programming, or other suitable manner.

Other suitable physical barriers include rigid structures located within an operator presence detector and between at least some of the zones, rigid structures located at or above the surface of an operator presence detector and between at least some of the zones and other structures suitable for hindering placement of a foot in a location where the foot is detected by a sensor arrangement and subsequently determined to be present in more than one zone such that a vehicle function would be enabled by the one foot.

Figure 8:
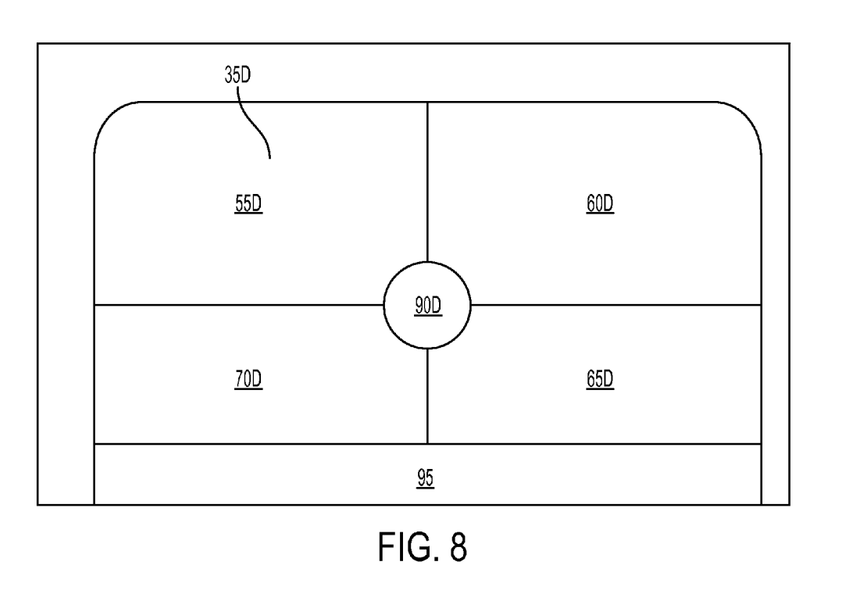
FIG. 8 is a schematic diagram of another operator presence detector embodiment.

The embodiment illustrated in FIG. 8 has a similar configuration and operation to the embodiment illustrated in FIGS. 2, 3, and 4, but includes two optional, exemplary shut-off zones 90D and 95. A dataset used by a logic device, such as processor 80 (FIG. 5), may be similar to that illustrated in FIG. 6, but may include additional entries. For example, additional entries include whether a foot is present in either the shut-off zone 95 or the shut-off zone 90D or not. If a foot is detected in either of the shut-off zones 90D or 95 the processor 80 does not transmit or send an enable signal based on receiving a foot-present signal from either of the shut-off zones 90D or 95, even if the operator's feet are otherwise placed such that the feet are detected in zones 55D, 60D, 65D, and 70D in a predetermined configuration, for this example, corresponding to a dataset entry carrying an "enable" designation. In certain embodiments, either of the shut-off zones 90D or 95 may create and transmit a shut-off signal to the logic device, such as processor 80, that tells the logic device not to transmit an enable signal.

Figure 9:
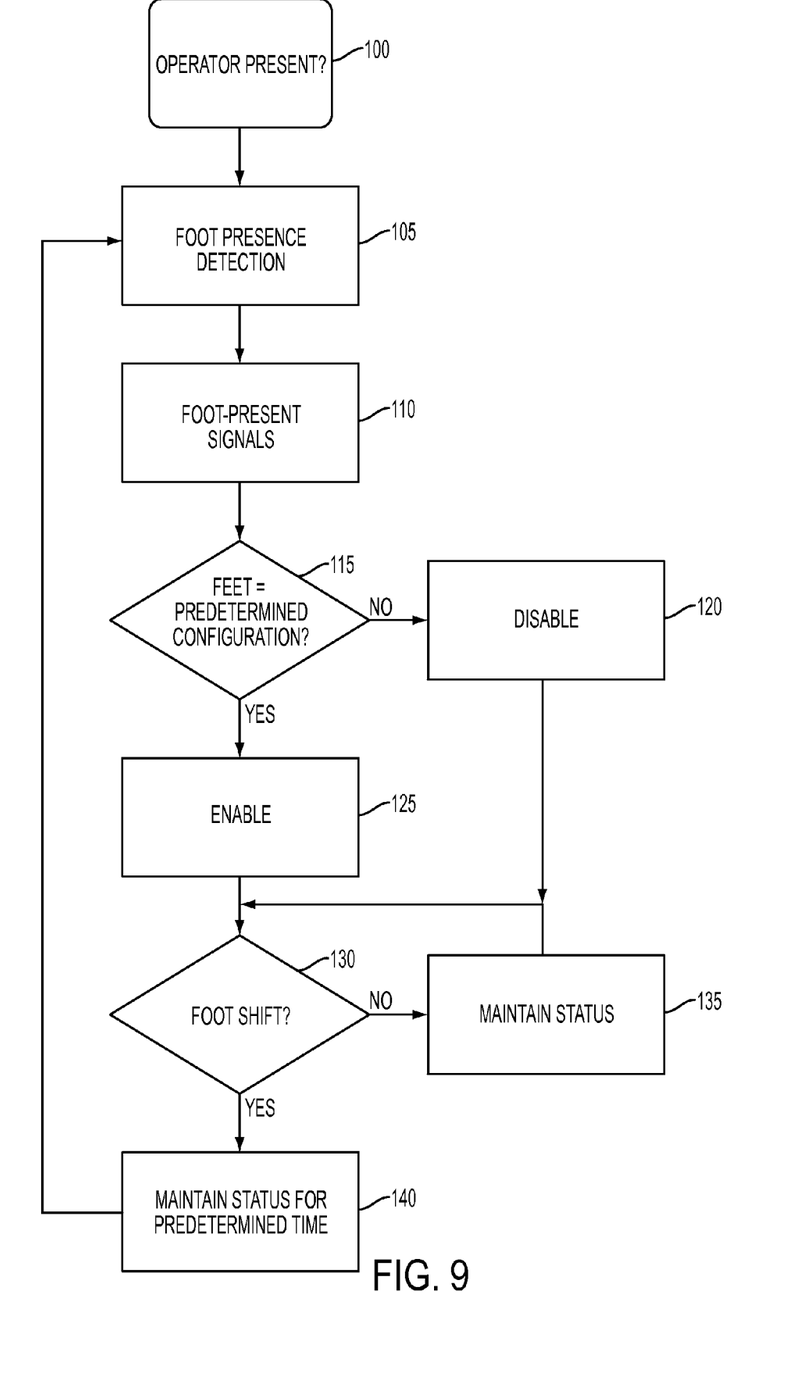
FIG. 9 is a flowchart of an exemplary method for operating an operator presence detector.

FIG. 9 illustrates an example method for operating an operator presence detector, such as operator presence detector 35. At 100, an operator steps onto a drive platform and a sensor arrangement detects the presence of the operator's feet received by zones of the operator presence detector at 105. At 110, foot-present signals corresponding to the zones where a foot is detected are generated and transmitted to a logic device. Based on the foot-present signals, the logic device determines whether the operator's feet are present in the zones in a predetermined configuration at 115.

If the operator's feet are not present in the zones in a predetermined configuration at least a selected vehicle function is or remains disabled, or the logic device generates and transmits a disable signal, at 120. If the operator's feet are present in the zones in a predetermined configuration, the logic device generates and transmits an enable signal at 125 to enable at least a vehicle function.

In some embodiments that include one or more shut-off zones, the logic device may determine whether a signal is received from at least one of the shut-off zones after step 115, but before step 125. If no signal is received from a shut-off zone, processing continues to step 125. Otherwise, if a signal is received from a shut-off zone, processing continues to step 120.

At 130 the sensor arrangement detects whether the operator shifted the position of one foot or of both feet. If not, at 135 the logic device maintains the current enabled or disabled status for the at least one vehicle function. If so, at 140 a signal delay device causes the logic device to maintain the current enabled or disabled status for the at least one vehicle function for a predetermined time period while processing returns to 105.

It will be apparent to those skilled in the art that various modifications and variations can be made to the systems and methods of the present disclosure. Other embodiments of the methods and systems will be apparent to those skilled in the art from consideration of the specification and practice of the methods and systems disclosed herein. It is intended that the specification and examples be considered as exemplary only, with a true scope of the invention being indicated by the claims and their equivalents.

The invention claimed is:

1. An operator presence detector for enabling a function of a vehicle comprising:
    at least three zones, wherein each zone is configured to receive at least a portion of an operator's foot;
    a sensor arrangement associated with the zones and configured to (i) detect the presence of at least a portion of a foot in each of the zones and (ii) generate foot-present signals corresponding to the zones where at least a portion of a foot is detected; and
    a logic device that receives the foot-present signals from the sensor arrangement and sends a signal to the vehicle, wherein, based on the foot-present signals, the logic device is programmed to (i) determine whether an operator's feet are present in at least two of the zones in a predetermined configuration and (ii) send an enable signal to the vehicle thus enabling the function if an operator's feet are present in the zones in a predetermined configuration.

2. The operator presence detector of claim 1, wherein the logic device is further programmed to send a disable signal to the vehicle thus disabling the function if an operator's feet are not present in the zones in a predetermined configuration.

3. The operator presence detector of claim 1, wherein at least one zone comprises a shut-off zone and the logic device is further programmed to not send an enable signal when the logic device receives a foot-present signal from the shut-off zone.

4. The operator presence detector of claim 1, further comprising a signal delay device configured to continue providing a foot-present signal to the logic device corresponding to a zone where an operator foot was present for a predetermined amount of time after the sensor arrangement stops detecting the presence of a foot in the zone.

5. The operator presence detector of claim 4, wherein: the logic device comprises a relay; and the signal delay device comprises a timer relay.

6. The operator presence detector of claim 1, further comprising a signal delay device configured to measure a predetermined time period during which an enable signal is transmitted after cessation of a foot-present signal corresponding to a zone where an operator foot was present.

7. The operator presence detector of claim 6, wherein: the logic device comprises a digital processor; and the signal delay device comprises a clock associated with the digital processor.

8. The operator presence detector of claim 1, further comprising a physical barrier arranged to prevent an operator from placing one foot in a position where the sensor arrangement detects the presence of the one foot in more than one zone such that a vehicle function would be enabled by the one foot.

9. The operator presence detector of claim 1, wherein the zones are physically located with respect to each other to prevent an operator from placing one foot in a position where the sensor arrangement detects the presence of the one foot in more than one zone such that a vehicle function would be enabled by the one foot.

10. The operator presence detector of claim 1, wherein the sensor arrangement comprises a pressure sensitive mat divided into at least two pressure sensing areas with each of the pressure sensing areas corresponding to one of the zones configured to receive at least a portion of an operator's foot.

11. The operator presence detector of claim 1, wherein the sensor arrangement comprises at least two pressure sensitive switches with each of the pressure sensitive switches corresponding to one of the zones configured to receive at least a portion of an operator's foot.

12. The operator presence detector of claim 1, wherein each of the zones are substantially co-planar.

13. The operator presence detector of claim 1, wherein the zones cover substantially all of a floor of an operator's compartment.

14. A method for enabling a vehicle function based on detecting an operator presence comprising:
via a sensor arrangement, detecting whether at least a portion of a foot is present in any of at least three zones, wherein each zone is configured to receive at least a portion of an operator's foot;
generating a foot-present signal corresponding to the zones where a foot is detected;
via a logic device, receiving the foot-present signals and, based on the foot-present signals determining whether an operator's feet are present in at least two of the zones in a predetermined configuration; and
sending an enable signal to the vehicle thus enabling the function if an operator's feet are present in the zones in a predetermined configuration.

15. The method of claim 14, further comprising: for a predetermined amount of time, continuing to generate a foot-present signal corresponding to a zone where a foot was detected after the sensor arrangement stops detecting the presence of a foot in the zone.

16. The method of claim 14, further comprising: continuing to send an enable signal for a predetermined amount of time after cessation of a foot-present signal corresponding to a zone where a foot was detected.

17. The method of claim 14, further comprising:
via the sensor arrangement, detecting whether at least a portion of a foot is present in a shut-off zone;
generating a shut-off signal in response to detecting the presence of at least a portion of a foot in the shut-off zone; and
disabling the vehicle function based on the shut-off signal.

18. An operator presence detector for enabling a function of a vehicle comprising:
a sensor means associated with three or more zones for detecting the presence of at least a portion of a foot in each of the zones and generating foot-present signals corresponding to the zones when at least a portion of a foot is detected; and
a logic means for determining whether an operator's feet are present in at least two of the zones in a predetermined configuration and sending an enable signal to the vehicle thus enabling the function if an operator's feet are present in the zones in a predetermined configuration.

* * * * *